United States Patent
Kimura et al.

(10) Patent No.: US 10,812,008 B2
(45) Date of Patent: Oct. 20, 2020

(54) MOTOR APPARATUS AND MOTOR SYSTEM

(71) Applicant: Nidec Corporation, Kyoto (JP)

(72) Inventors: Masahiro Kimura, Kyoto (JP); Hirotaka Takahashi, Kyoto (JP); Masaki Kato, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 7 days.

(21) Appl. No.: 16/211,279

(22) Filed: Dec. 6, 2018

(65) Prior Publication Data
US 2019/0190434 A1    Jun. 20, 2019

(30) Foreign Application Priority Data

Dec. 20, 2017  (JP) ................ 2017-244211

(51) Int. Cl.
| | |
|---|---|
| *B65D 51/24* | (2006.01) |
| *H02P 29/20* | (2016.01) |
| *H02P 6/04* | (2016.01) |
| *H02K 11/33* | (2016.01) |
| *H02P 31/00* | (2006.01) |
| *H02P 6/08* | (2016.01) |
| *H04R 1/02* | (2006.01) |
| *G06F 3/16* | (2006.01) |

(52) U.S. Cl.
CPC .............. *H02P 29/20* (2016.02); *H02K 11/33* (2016.01); *H02P 6/04* (2013.01); *H02P 6/08* (2013.01); *H02P 31/00* (2013.01); *G06F 3/167* (2013.01); *H02P 2006/045* (2013.01); *H04R 1/028* (2013.01)

(58) Field of Classification Search
CPC ... H02K 11/33; H02P 2006/045; H02P 31/00; H02P 6/04; H02P 6/08; H04R 1/028; H04R 2201/025
See application file for complete search history.

(56) References Cited

U.S. PATENT DOCUMENTS

| | | | | |
|---|---|---|---|---|
| 4,245,430 A | * | 1/1981 | Hoyt | ............. A63H 30/04 181/125 |
| 5,407,376 A | * | 4/1995 | Avital | ............. A63H 3/40 446/175 |
| 2016/0129576 A1 | * | 5/2016 | Nishikawa | ......... B25D 11/125 173/2 |
| 2016/0181885 A1 | * | 6/2016 | Yamasaki | ............. H02K 11/33 180/443 |

* cited by examiner

*Primary Examiner* — Muhammad S Islam
(74) *Attorney, Agent, or Firm* — Keating & Bennett, LLP

(57) ABSTRACT

A motor apparatus includes a motor body, a circuit board, a driver, and a voice detector. The circuit board, which is connected to the motor body, supplies driving electric power to the motor body. The driver, which is mounted on the circuit board, converts power source electric power to the driving electric power. The voice detector, which is mounted on the circuit board, detects a voice.

13 Claims, 8 Drawing Sheets

500

| PRIORITY ORDER | TRIGGER |
|---|---|
| 1 | MANIPULATION |
| 2 | VOICE DETECTED BY MOTOR APPARATUS OF INTEREST |
| 3 | VOICE FROM ANOTHER MOTOR APPARATUS |

500

| PRIORITY ORDER | TRIGGER |
|---|---|
| 1 | MANIPULATION |
| 2 | VOICE DETECTED BY MOTOR APPARATUS OF INTEREST |
| 3 | VOICE FROM ANOTHER MOTOR APPARATUS |

| RENEWABLE ENERGY | OPERATION MODE (1) (POWER CONSUMPTION: HIGH) |
|---|---|
| FOSSIL FUEL | OPERATION MODE (2) (POWER CONSUMPTION: LOW) |

Fig.9

MOTOR APPARATUS AND MOTOR SYSTEM

CROSS REFERENCE TO RELATED APPLICATIONS

This application claims the benefit of priority to Japanese Patent Application No. 2017-244211 filed on Dec. 20, 2017. The entire contents of this application are hereby incorporated herein by reference.

BACKGROUND OF THE INVENTION

1. Field of the Invention

The present disclosure relates to a motor apparatus and a motor system.

2. Description of the Related Art

The housing of a known motor accommodates a circuit board on which electronic parts are mounted, together with a rotor and a stator.

With the popularity of Internet of Things (IoT) technologies, various types of information can be collected.

SUMMARY OF THE INVENTION

A motor apparatus according to an exemplary embodiment of the present disclosure includes a motor body, a circuit board, a driver, and voice detector. The circuit board, which is connected to the motor body, supplies driving electric power to the motor body. The driver, which is mounted on the circuit board, converts power source electric power to the driving electric power. The voice detector, which is mounted on the circuit board, detects a voice.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIG. 8 is a table explaining control according to a third variation of an exemplary embodiment of the present invention.

FIG. 9 is a table explaining control according to a fourth variation of an exemplary embodiment of the present invention.

DETAILED DESCRIPTION OF THE PREFERRED EMBODIMENTS

Exemplary embodiments of the present disclosure will be described below with reference to the drawings.

A first embodiment will be described first. In the description below, a direction in which the central axis J of a motor apparatus extends will be taken as the vertical direction. However, the vertical direction in this embodiment is just a name used for explanation purposes and does not limit actual positional relationships or actual directions. Unless otherwise noted, a direction parallel to the central axis J will be simply referred to as the axial direction, a radial direction around the central axis J will be simply referred to as the radial direction, and a circumferential direction around the central axis J (direction around the central axis J) will be simply referred to as the circumferential direction.

Figure 1:
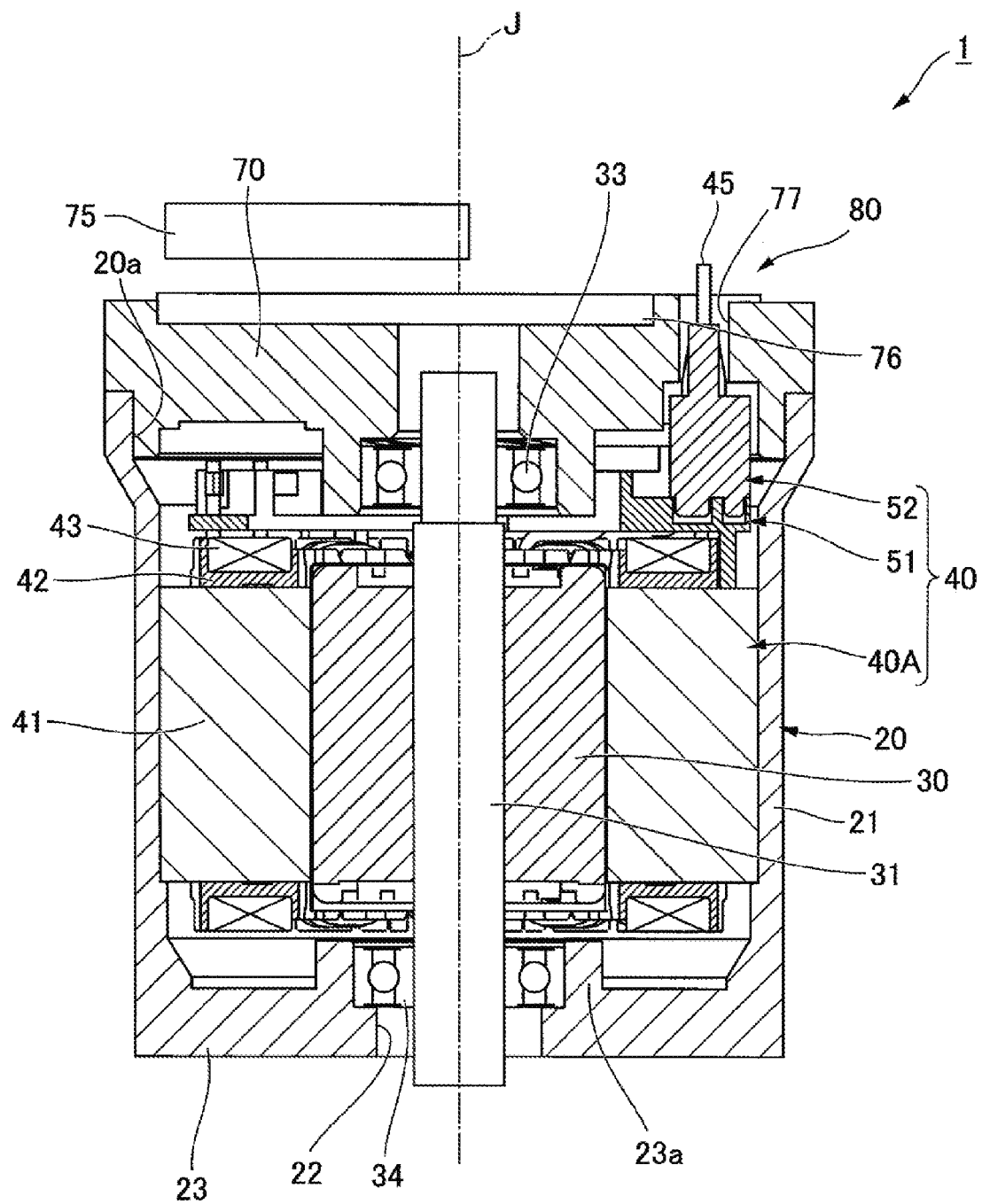
FIG. 1 is a cross-sectional view of a motor apparatus according to a first exemplary embodiment of the present invention.

FIG. 1 is a cross-sectional view of a motor apparatus 1 in this embodiment. The motor apparatus 1 has a housing 20, a rotor 30, a stator 40, a bearing holder 70, and a circuit board 80. In the motor apparatus 1, the circuit board 80, bearing holder 70, and stator 40 are placed in that order from above toward below.

The stator 40 has a stator body 40A including a coil 43 and also has a first support member 51 and a second support member 52 that support a coil wire 45 led out of the stator body 40A.

The housing 20 has a tubular portion 21 extending vertically, a bottom wall 23 positioned at the lower end of the tubular portion 21, and an opening 20a formed on the upper side of the housing 20. The stator body 40A is secured to the inner surface of the housing 20. The bearing holder 70 is inserted into the opening 20a in the housing 20. The circuit board 80 is placed on the upper surface of the bearing holder 70. The circuit board 80 is connected to the coil wire 45 exposed from a holder-passing-through portion 77 for the bearing holder 70.

In this embodiment, the tubular portion 21 is shaped like a cylinder the center of which is the central axis J. The shape of the tubular portion 21 is not limited to a cylinder. For example, the tubular portion 21 may be shaped like a polygonal tube.

The bottom wall 23 is disposed below the stator 40. The bottom wall 23 has a bearing holder 23a that holds a lower bearing 34 and an output axis hole 22 that passes through the bottom wall 23 in the axial direction.

The rotor 30 has a shaft 31. The center of the shaft 31 is the central axis J extending vertically. The rotor 30 rotates around the central axis J together with the shaft 31. The lower end of the shaft 31 passes through the output axis hole 22 and protrudes downward from the housing 20.

An upper bearing 33 and the lower bearing 34 support the shaft 31 so that it can rotate around the central axis J. The lower bearing 34 is held by the bearing holder 23a on the lower side of the stator 40. The upper bearing 33 is held by the bearing holder 70 on the upper side of the stator 40.

The stator body 40A is positioned outside the rotor 30 in the radial direction. In addition to the coil 43, the stator body 40A has a stator core 41 and an insulator 42. The insulator 42 is attached to the teeth of the stator core 41. The coil 43 is formed by winding the coil wire 45 on the insulator 42 and is placed on the teeth of the stator core 41. The outer circumferential surface of the stator 40 is secured to the inner circumferential surface of the housing 20.

The first support member 51, which is formed from a resin, is placed on the upper surface of the stator body 40A. The second support member 52, which is formed from a resin, is placed on the upper surface of the first support member 51. In this embodiment, the coil wire 45 is led out of the coil 43, is guided to the lower portion of the holder-passing-through portion 77 by the first support member 51, and is led out to the upper side of the holder-passing-through portion 77 by the second support member 52.

The stator 40 in this embodiment has a structure in which, for example, two three-phase winding groups, each of which is composed of six coils 43, are placed in the circumferential direction. The six coils 43 are, for example, three first coils, U1, V1 and W1, that respectively correspond to the U phase, V phase, and W phase and three second coils, U2, V2 and W2, that respectively correspond to the U phase, V phase, and W phase.

A first heat sink 75 is placed on the upper surface of the circuit board 80. A second heat sink 76 is placed on the lower surface of the circuit board 80. The circuit board 80 is connected to the coil wire 45 led out upward through the holder-passing-through portion 77 for the bearing holder 70. In this embodiment, the bearing holder 70 has a heat sink function. That is, the bearing holder 70 may double as the second heat sink 76.

A controller, an inverter circuit portion, a power supply circuit, a micro-electromechanical systems (MEMS) microphone, a communication circuit, and a storage unit, which will be described later, are mounted on the circuit board 80.

Figure 2:
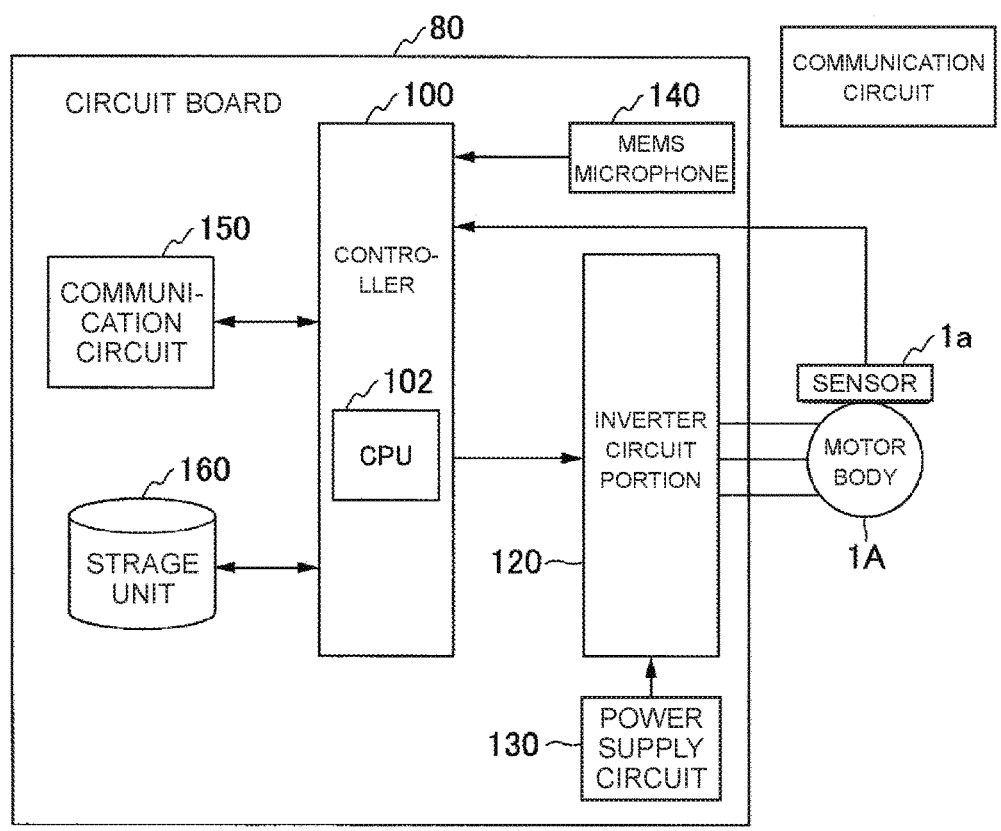
FIG. 2 is a block diagram illustrating a controller and other components mounted on a circuit board.

FIG. 2 is a block diagram illustrating the controller and other components mounted on the circuit board 80. A portion in which the circuit board 80 and the components mounted on the circuit board 80 are excluded from the motor apparatus 1 will be referred below as a motor body 1A. The motor body 1A is a brushless DC motor.

The controller 100, inverter circuit portion 120, power supply circuit 130, MEMS microphone 140, communication circuit 150, and storage unit 160 are mounted on the circuit board 80. The circuit board 80 is connected to the motor body 1A. The circuit board 80 supplies driving electric power to the motor body 1A.

Figure 3:
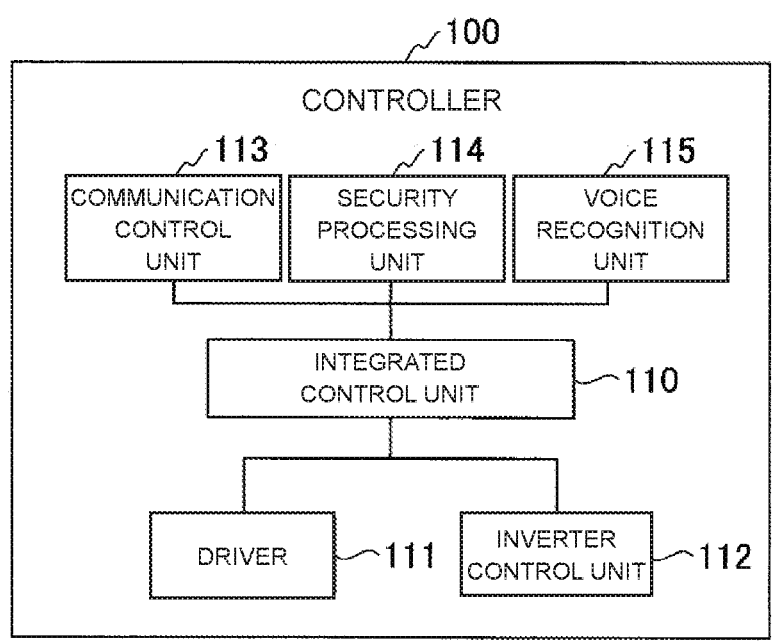
FIG. 3 is a block diagram illustrating the functional structure of the controller.

The controller 100 has a central processing unit (CPU) 102. The CPU 102 implements functional units as illustrated in FIG. 3 by executing various programs stored in the storage unit 160. FIG. 3 is a block diagram illustrating the functional structure of the controller 100.

The inverter circuit portion 120 includes, for example, a three-phase inverter, a capacitor, a choke coil, a relay, a shunt resistor, and the like (these components are not illustrated). The inverter circuit portion 120 turns on or off a switching element in the three-phase inverter in response to a control signal supplied from the controller 100. That is, the inverter circuit portion 120 converts power supply electric power supplied from the power supply circuit 130 to driving electric power. Thus, the inverter circuit portion 120 functions as a driver that is mounted on the circuit board 80 and converts power supply electric power to driving electric power.

The power supply circuit 130 receives electric power from, for example, a device in which the motor body 1A is mounted or from a commercial power supply, and converts the received electric power to power supply electric power at a predetermined voltage.

The MEMS microphone 140 is manufactured by using a semiconductor micromachining technology or the like. The MEMS microphone 140 is mounted on the circuit board 80. The MEMS microphone 140 has, for example, a vibrating film that receives sound pressure. The MEMS microphone 140 creates a sound signal according to vibration of the vibrating film, and outputs the created voice signal to the controller 100.

The MEMS microphone 140 may be mounted at any position. As the MEMS microphone 140, a single MEMS microphone may be mounted on the circuit board 80 or a plurality of MEMS microphones may be mounted thereon. If the MEMS microphone 140 is composed of a plurality of MEMS microphones, it may output a plurality of voice signals to the controller 100.

In addition, the MEMS microphone 140 may have a MEMS microphone that detects a driving sound from the motor body 1A or other noise, and may also have a MEMS microphone that detects a surrounding sound. Noise included in a voice signal detected by the MEMS microphone that detects a surrounding sound may be canceled by a signal having a phase opposite to the phase of a noise signal detected by the MEMS microphone that detects a driving sound from the motor body 1A or other noise.

Furthermore, the MEMS microphone 140 may combine (beamforms) a plurality of voice signals detected by a plurality of MEMS microphones mounted on the circuit board 80 and may output the combined voice signal to the controller 100.

The communication circuit 150 transmits and receives information under control of the controller 100. The communication circuit 150 may communicate according to, for example, a predetermined protocol under which communication is possible between motor apparatuses 1.

The storage unit 160 is implemented by, for example, a read-only memory (ROM), a flash memory, a secure digital (SD) card, a random-access memory (RAM), a register, or the like. The storage unit 160 stores various programs used by the controller 100 to execute processing, information that the communication circuit 150 has received, and voice signals detected by the MEMS microphone 140.

The controller 100 has, for example, an integrated control unit 110, a driver 111, an inverter control unit 112, a communication control unit 113, a security processing unit 114, and a voice recognition unit 115, as illustrated in FIG. 3. The integrated control unit 110, driver 111, inverter control unit 112, communication control unit 113, security processing unit 114, and voice recognition unit 115 are implemented when the CPU 102 executes programs stored in the storage unit 160. Programs may be downloaded from, for example, a server through a network, or may be preinstalled in the controller 100. The controller 100 may be implemented by hardware such as a large-scale integration (LSI) chip, an application-specific integrated circuit (ASIC), or a field-programmable gate array (FPGA) or in cooperation between software and hardware.

The integrated control unit 110 executes processing equivalent to an operating system. The integrated control unit 110 controls inputs from and outputs to various units connected to the controller 100, manages the MEMS microphone 140, communication circuit 150 and storage unit 160, manages processes, and performs other basic management and control as performed by a computer. Specifically, the integrated control unit 110 causes the driver 111 and inverter control unit 112 to control the operation of the motor body 1A. The integrated control unit 110 causes the communication control unit 113 to control the operation of the communication circuit 150. The integrated control unit 110 causes the security processing unit 114 to control security processing. The integrated control unit 110 causes the voice recognition unit 115 to control voice recognition processing and predetermined processing on voice data.

The driver 111 infers a position and a speed according to positional information detected by a sensor 1a such as a hall element. The inverter control unit 112 controls the position and speed of the motor body 1A according to the inferred position and speed as well as a commanded value. The inverter control unit 112 controls the voltage of driving electric power used to implement the position and speed of the motor body 1A to be controlled.

The inverter control unit 112 creates a switching signal that turns on or off a switching element in the inverter circuit portion 120 so that a voltage controlled by the driver 111 is obtained. The inverter control unit 112 outputs the created switching signal to the inverter circuit portion 120. The integrated control unit 110 causes the driver 111 and inverter control unit 112 to control the operation of the motor body 1A according to, for example, a voice detected by the MEMS microphone 140.

The communication control unit 113 controls the communication circuit 150. If the communication control unit 113 receives, from the integrated control unit 110, data to be transmitted to the outside, the communication control unit 113 outputs the received data to the communication circuit 150. If the communication control unit 113 receives data that the communication circuit 150 has received, the communication control unit 113 outputs the received data to the integrated control unit 110. The integrated control unit 110 causes the communication control unit 113 to transmit, for example, voice data based on a voice detected by the MEMS microphone 140 to an external apparatus.

The security processing unit 114 performs processing related to communication security. The security processing unit 114 authenticates another motor apparatus 1, which will become a distant party of the communication circuit 150, by using, for example, the characteristic value of the other motor apparatus 1. The storage unit 160 stores the characteristic value of the other motor apparatus 1 in advance as a distant party for which communication is permitted. When communication with other motor apparatus 1 is to be started, the security processing unit 114 receives, for example, the characteristic value of the other motor apparatus 1 from it and decides whether there is a match between the received characteristic value and the characteristic value stored in the storage unit 160. If there is a match between these characteristic values, the security processing unit 114 decides that authentication has succeeded and permits communication. If there is no match between these characteristic values, the security processing unit 114 decides that authentication has failed and does not permit communication. The integrated control unit 110 can cause the communication control unit 113 to control the start of communication by the communication circuit 150 according to an authentication result.

The security processing unit 114 may use the characteristic value of the motor apparatus 1 to encrypt or decrypt data. Specifically, the security processing unit 114 acquires data to be transmitted to another motor apparatus 1 and encrypts the acquired data by using the characteristic value of the motor apparatus 1 that includes the security processing unit 114 or the characteristic value of the other motor apparatus 1. Also, the security processing unit 114 acquires data received from the other motor apparatus 1 and decrypts the acquired data by using the characteristic value of the other motor apparatus 1 or the characteristic value of the motor apparatus 1 that includes the security processing unit 114. The integrated control unit 110 can cause the communication control unit 113 to transmit the encrypted data to and receive it from the communication circuit 150.

Although the characteristic value of the motor apparatus 1 may be stored in the storage unit 160, this is not a limitation. The characteristic value of the motor apparatus 1 may be stored in the CPU 102, which is at a high security level.

The voice recognition unit 115 performs predetermined signal processing on a voice signal, and performs voice recognition processing on a voice signal detected by the MEMS microphone 140. The predetermined signal processing is, for example, processing to extract a voice feature value or processing to cancel noise, which is a sound other than voices. The predetermined signal processing may be a fast Fourier transform (FFT) or the like. The voice recognition unit 115 performs voice recognition processing to create voice information that represents the contents of a voice. The controller 100 accumulates the created voice information in the storage unit 160. The voice recognition unit 115 may perform voice recognition processing not only on a voice signal detected by the MEMS microphone 140 in the motor apparatus 1 that includes the voice recognition unit 115 but also on a voice signal detected by the MEMS microphone 140 in another motor apparatus 1. The integrated control unit 110 can cause the driver 111 and inverter control unit 112 to control the operation of the motor body 1A according to a voice recognition result. For example, the operation of the motor body 1A can be controlled by voice recognition of a specific word of the user such as "move" or "stop".

The motor apparatus 1 described above has the motor body 1A, the circuit board 80, connected to the motor body 1A, that supplies driving electric power to the motor body 1A, the inverter circuit portion 120 (driver), mounted on the circuit board 80, that converts power supply electric power to driving electric power, and the MEMS microphone 140 (voice detector), mounted on the circuit board 80, that detects a voice. Although the motor body 1A is a brushless DC motor, this is not a limitation. Various types of motor body 1A are available and are used in various applications. For example, the motor apparatus 1 can be used as a motor incorporated into a refrigerator, a washing machine, a bracket clock, or another household device. Thus, the motor apparatus 1 can easily collect voice information in a household.

Since the motor apparatus 1 uses a brushless DC motor as the motor body 1A, if the brushless DC motor generates less noise such as a wear sound generated by the brush, it is possible to collect voice information having high voice quality. The motor apparatus 1 can also increase precision in voice recognition processing.

The motor apparatus 1 further has the integrated control unit 110, mounted on the circuit board 80, that controls the motor body 1A. In the motor apparatus 1, therefore, the integrated control unit 110 and security processing unit 114 can be mounted on the same circuit board 80, restraining the motor apparatus 1 from becoming large. The motor apparatus 1 can also control the motor body 1A according to a voice, so it is possible to control the motor body 1A according to the user's word and action.

Furthermore, in the motor apparatus 1, the integrated control unit 110 causes the voice recognition unit 115 to perform predetermined signal processing on voice data based on a voice detected by the MEMS microphone 140. Therefore, the motor apparatus 1 can performs voice recognition and the like by using voice data on which the predetermined signal processing has been performed.

Furthermore, in the motor apparatus 1, the integrated control unit 110 causes the voice recognition unit 115 to perform processing to recognize a voice detected by the MEMS microphone 140 and controls the operation of the motor body 1A according to a voice recognition result. Therefore, the motor apparatus 1 can optimize motor control for a voice generated by the user.

The motor apparatus 1 further has the communication circuit 150, mounted on the circuit board 80, that transmits voice data based on a voice detected by the MEMS microphone 140 to an external apparatus. Therefore, the motor apparatus 1 can cause the external apparatus to receive and collect voice data.

A second embodiment will be described below. Elements that are the same as in the first embodiment described above will be given the same reference characters and descriptions will be omitted. The second embodiment is a motor system in which a plurality of motor apparatuses mutually communicate according to a predetermined protocol. Each of these motor apparatuses is the motor apparatus 1 described in the first embodiment.

Figure 4:
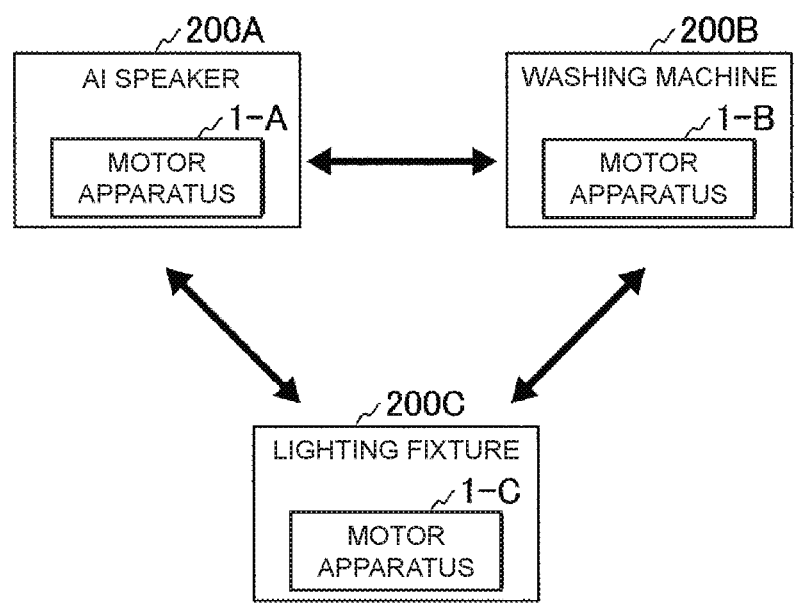
FIG. 4 illustrates an example of a motor system according to a second exemplary embodiment of the present invention.

FIG. 4 illustrates an example of a motor system in the second embodiment. The motor system incorporates, for example, an artificial intelligence (AI) speaker 200A, a washing machine 200B, and a lighting fixture 200C. The AI speaker 200A incorporates a motor apparatus 1-A. The motor apparatus 1-A drives an actuator used to adjust the orientation of the AI speaker 200A, for example. The washing machine 200B incorporates a motor apparatus 1-B. The motor apparatus 1-B operates the washing machine 200B. The lighting fixture 200C incorporates a motor apparatus 1-C. The motor apparatus 1-C drives an actuator used to adjust the orientation of the lighting fixture 200C, for example.

The motor apparatus 1-A, motor apparatus 1-B, and motor apparatus 1-C each use the communication circuit 150 to transmit voice data based on a voice detected by the MEMS microphone 140 in the transmitting motor apparatus to other motor apparatuses other than the transmitting motor apparatus. The motor apparatus 1-A, motor apparatus 1-B, and motor apparatus 1-C each control the operation of the motor body 1A according to the voice data received by the communication circuit 150. That is, the integrated control unit 110 in each of a plurality of motor apparatuses, motor apparatus 1-A, motor apparatus 1-B and motor apparatus 1-C, controls the operation of the motor body 1A according to voice data received by the communication circuit 150. Therefore, each of the plurality of motor apparatuses can transmit voice data to the other motor apparatuses other than the transmitting motor apparatus and can also receive voice data through the communication circuit 150. This enables each of a plurality of motor apparatuses to communicate with the other motor apparatuses of the plurality of motor apparatuses.

Specifically, the motor body 1A incorporated into the AI speaker 200A transmits voice data at a time when the user talked to the AI speaker 200A to the motor apparatus 1-B incorporated into the washing machine 200B. The motor apparatus 1-B operates the motor body 1A according to the received voice data.

In a case in which the AI speaker 200A fails or cannot detect a voice, the motor apparatus 1-B may drive the motor body 1A according to voice data based on a voice detected by the MEMS microphone 140 mounted in the motor apparatus 1-B. Alternatively, the motor apparatus 1-B may transmit the voice data based on the detected voice to the motor apparatus 1-C incorporated into the lighting fixture 200C and the motor apparatus 1-C may drive the motor body 1A. That is, in a case in which the AI speaker 200A cannot detect a voice, a motor apparatus that has recognized a voice, which is motor apparatus 1-B or 1-C, may become a master.

Figure 5:
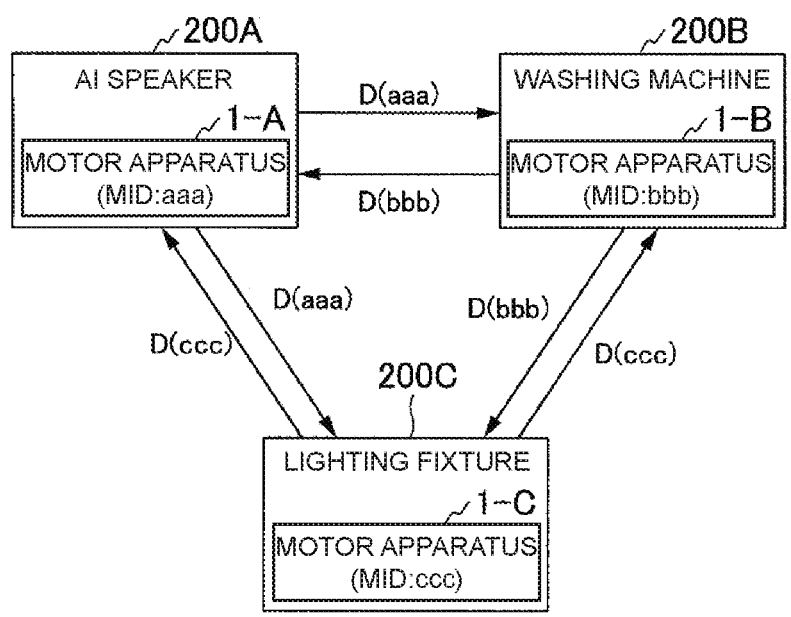
FIG. 5 illustrates another example of the motor system according to the second exemplary embodiment of the present invention.

FIG. 5 illustrates another example of the motor system in the second embodiment. Each of the motor apparatuses 1-A, 1-B, and 1-C has its own characteristic value as information used to identify the motor apparatus. Each of the motor apparatuses 1-A, 1-B, and 1-C causes the security processing unit 114 to encrypt data with the characteristic value (aaa, bbb, or ccc) of the motor apparatus 1-A, 1-B, or 1-C, and also causes the communication circuit 150 to transmit the encrypted data D(aaa), D(bbb), or D(ccc) to another motor apparatus 1.

As described above, in the motor system in the second embodiment, each motor apparatus 1 transmits voice data based on a voice detected by the MEMS microphone 140 to another motor apparatus 1 other than the transmitting motor apparatus 1, so it is possible to collect voice data detected by other motor apparatuses 1. Thus, the motor system in the second embodiment can contribute to information collection.

In the motor system, it is also possible to control the operation of the motor body 1A according to voice data transmitted from another motor apparatus 1. Therefore, the motor body 1A can be operated according to a voice of the user present at a distance from the motor apparatus 1 of interest.

Figure 6:
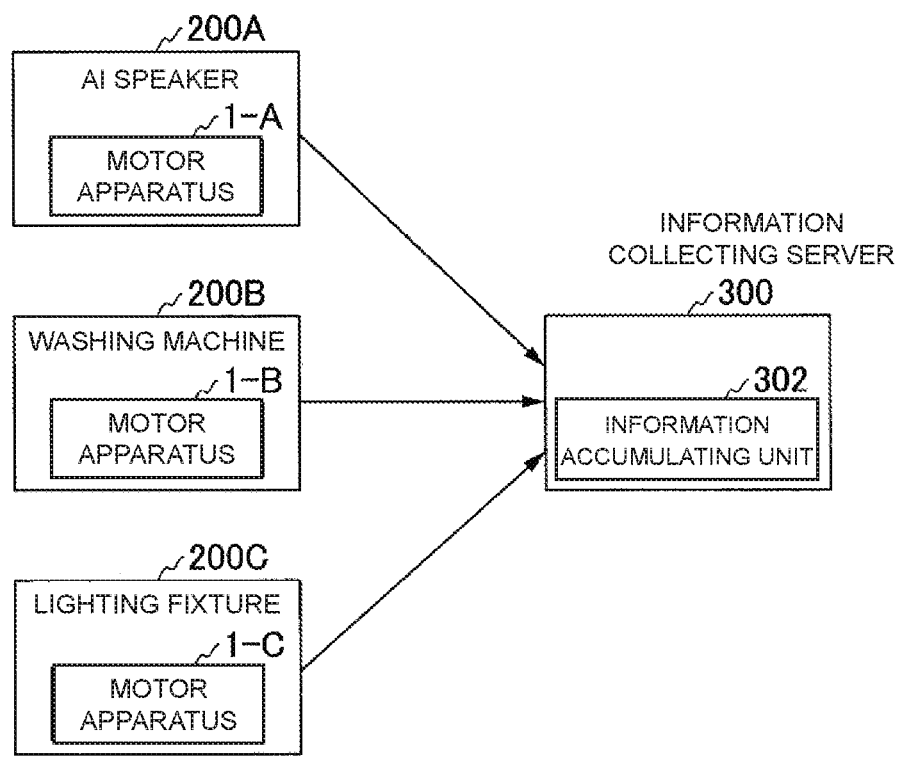
FIG. 6 is a block diagram illustrating a motor system according to a first variation of an exemplary embodiment of the present invention.

FIG. 6 is a block diagram illustrating a motor system in a first variation. In this motor system, a plurality of motor apparatuses, 1-A, 1-B and 1-C, are connected to an information collecting server 300 through a network. Although the network may be a home local area network (LAN), this is not a limitation. The Internet or another network outside the household may be used. The information collecting server 300 has an information accumulating unit 302 that accumulates information, for example. An example of the information accumulating unit 302 is an information storage device in a storage server. In the motor system in the first variation, voices detected in the vicinity of devices into which the motor apparatuses 1-A, 1-B, and 1-C are incorporated can be collected at a single place.

Figure 7:
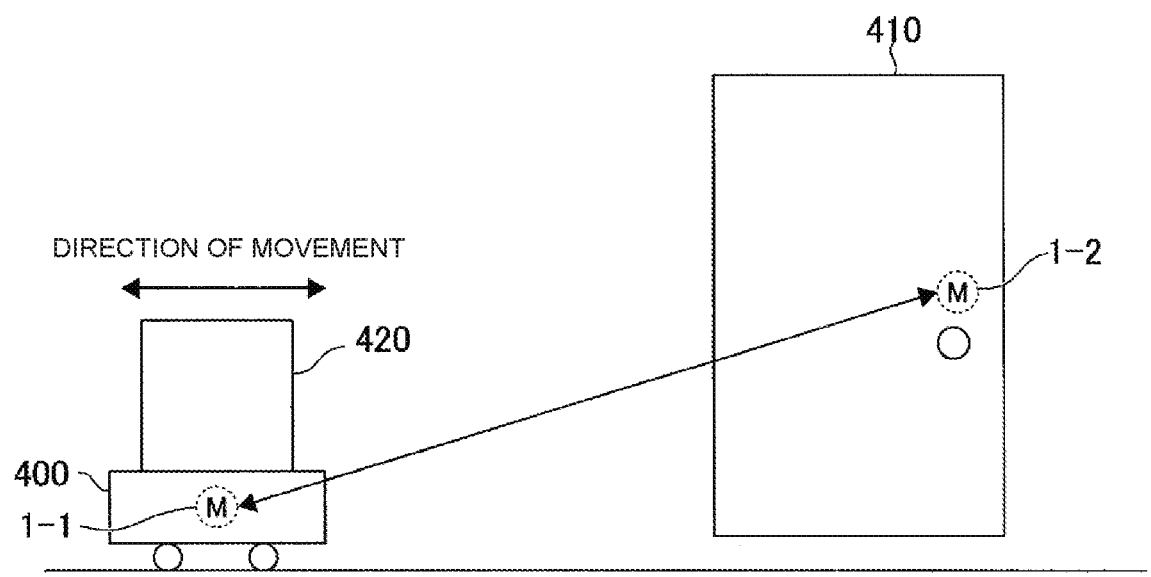
FIG. 7 schematically illustrates a motor system according to a second variation of an exemplary embodiment of the present invention.

FIG. 7 schematically illustrates a motor system in a second variation. The motor system in the second variation has a motor apparatus 1-1 incorporated into an unattended mobile body 400 and a motor apparatus 1-2 used to lock and unlock a door 410, for example. An example of the unattended mobile body 400 is an unattended transport vehicle to which electric power used for charging is contactlessly supplied. The unattended mobile body 400 with baggage 420 loaded travels to the residence of a receiver, which is the delivery destination of the baggage 420.

The motor apparatus 1-2 detects a voice in a residence and transmits a voice detection result to the motor apparatus 1-1. The motor apparatus 1-1 receives the voice detection result and decides whether a person is present in the residence according to the received voice detection result. If a person is present in the residence, the motor apparatus 1-1 generates a driving force so that the unattended mobile body 400 travels toward the door 410. If a person is not present in the residence, the motor apparatus 1-1 does not cause the unattended mobile body 400 to travel toward the door 410 but causes the unattended mobile body 400 to return to a predetermined position at which baggage 420 is collected. Although the voice detection result is voice data, this is not a limitation. The voice detection result may be a voice recognition result or may be voice-based information that represents the presence or absence of a person.

FIG. 8 is a table explaining control in a third variation. The motor apparatus 1 in the embodiments described above sets a priority order for voices by which control of the motor body 1A of the motor apparatus 1 is triggered. The motor apparatus 1 stores table data 500, illustrated in FIG. 8, in the storage unit 160, for example. The table data 500 includes information in which information that represents a manipulation is associated with information that represents 1 indicating the highest priority. The table data 500 also includes information in which information that represents a voice detected by the motor apparatus 1 is associated with information that represents 2 indicating the second highest priority after 1. The table data 500 also includes information in which information that represents a voice received from another motor apparatus 1 is associated with information that represents 3 indicating the lowest priority.

The motor apparatus 1 operates as described below according to the table data 500. If, for example, a competition occurs between a timing at which to control the motor body 1A according to a manipulation for a device in which the motor apparatus 1 is mounted and a timing at which to control the motor body 1A according to a voice detected by the MEMS microphone 140 in the motor apparatus 1, the motor apparatus 1 controls the motor body 1A according to the manipulation for the device in which the motor apparatus 1 is mounted. If, for example, a competition occurs between a timing at which to control the motor body 1A according to a voice detected by the MEMS microphone 140 in the motor apparatus 1 and a timing at which to control the motor body 1A according to a voice detected by the MEMS microphone 140 in another motor apparatus 1, the motor apparatus 1 controls the motor body 1A according to the voice detected by the MEMS microphone 140 in the motor apparatus 1. In a case in which, for example, the motor apparatus 1 does not control the motor body 1A according to a manipulation for a device in which the motor apparatus 1 is mounted, nor does it control the motor body 1A according to a voice detected by the MEMS microphone 140 in the motor apparatus 1, if a timing at which to control the motor body 1A according to a voice detected by the MEMS microphone 140 in another 1 is reached, the motor apparatus 1 controls the motor body 1A according to the voice detected by the MEMS microphone 140 in the other motor apparatus 1.

FIG. 9 is a table explaining control in a fourth variation. The motor apparatus 1 in the embodiments described above switches its operation mode between an operation mode (1) and an operation mode (2) according to information related to energy from which power source electric power is generated. In the operation mode (1), more electric power is consumed than in the operation mode (2). To make a switchover between these operation modes, the motor apparatus 1 stores table data 510, illustrated in FIG. 9, in the storage unit 160, for example. In the table data 510, information that represents the operation mode (1) is associated with information that represents renewable energy as information related to energy from which power source electric power is generated, and information that represents the operation mode (2) is associated with information that represents a fossil fuel as information related to energy from which power source electric power is generated.

The motor apparatus 1 operates as described below according to the table data 510. The motor apparatus 1 acquires information related to energy from which power source electric power is generated. The motor apparatus 1 may, for example, receive information about the remaining capacity of a battery placed outside the household through a home network to decide whether energy from which power source electric power is generated is renewable energy or a fossil fuel. However, the motor apparatus 1 may also make this decision according to the user's switching manipulation. The motor apparatus 1 only needs to acquire information related to energy from which power source electric power is generated in some kind of way. The motor apparatus 1 switches its operation mode between the operation mode (1) and the operation mode (2) according to the information related to energy from which power source electric power is generated.

As described above, in the fourth variation, if power source electric power is being generated from renewable energy, an actuation that consumes much electric power becomes dominant in movement. If power source electric power is being generated from a fossil fuel, electric power consumption can be reduced by making a switchover to the required minimum actuation or by mainly using sensing functions to suppress actuations.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A motor apparatus comprising:
a motor body;
a circuit board connected to the motor body to supply driving electric power to the motor body;
a driver mounted on the circuit board to convert power source electric power to the driving electric power;
a voice detector mounted on the circuit board to detect a voice;
an integrated controller mounted on the circuit board to control the motor body; and
a communication circuit mounted on the circuit board to transmit to an external apparatus voice data based on a voice detected by the voice detector; wherein
the external apparatus is an additional motor apparatus other than the motor apparatus.
2. The motor apparatus according to claim 1, wherein
the driver includes an inverter circuit to convert the power source electric power to the driving electric power according to open/close operations of a plurality of switches; and
the motor body includes a brushless DC motor that operates according to the driving electric power.
3. The motor apparatus according to claim 1, wherein the integrated controller performs signal processing on voice data based on the voice detected by the voice detector.
4. The motor apparatus according to claim 1, wherein the integrated controller controls an operation of the motor body according to the voice detected by the voice detector.
5. The motor apparatus according to claim 1, wherein the integrated controller performs processing to recognize a voice detected by the voice detector and controls an operation of the motor body according to a voice recognition result.
6. The motor apparatus according to claim 1, wherein the additional motor apparatus includes an additional motor body and an additional communication circuit.
7. The motor apparatus according to claim 1, wherein the voice detector includes a MEMS microphone.

8. The motor apparatus according to claim 2, wherein
the circuit board further includes a power supply circuit connected to the inverter circuit.

9. A motor system in which a plurality of motor apparatuses mutually communicate according to a predetermined protocol, each of the plurality of motor apparatuses comprising:
- a motor body;
- a circuit board connected to the motor body to supply driving electric power that drives the motor body;
- a driver mounted on the circuit board to convert power source electric power to the driving electric power;
- a voice detector mounted on the circuit board to detect a voice;
- an integrated controller to control an operation of the motor body; and
- a communication circuit mounted on the circuit board to transmit voice data based on a voice detected by the voice detector to a motor apparatus other than the motor apparatus from which the voice data has been transmitted.

10. The motor system according to claim 9, wherein each integrated controller in the plurality of motor apparatuses controls an operation of the motor body according to voice data received from the communication circuit.

11. The motor system according to claim 9, wherein
the motor apparatus other than the motor apparatus from which the voice data has been transmitted includes an additional motor body and an additional communication circuit.

12. The motor system according to claim 9, wherein
the circuit board further includes a power supply circuit connected to an inverter circuit.

13. The motor system according to claim 9, wherein
the voice detector includes a MEMS microphone.

* * * * *